United States Patent [19]

Nehmey et al.

[11] 4,370,286

[45] Jan. 25, 1983

[54] CHLORINATED POLYVINYL CHLORIDE COMPOSITION

[75] Inventors: Samuel D. Nehmey, Lorain; James W. Summers, Bay Village, both of Ohio

[73] Assignee: The B. F. Goodrich Company, Akron, Ohio

[21] Appl. No.: 301,905

[22] Filed: Sep. 14, 1981

[51] Int. Cl.$^3$ ............................................. B29H 7/20
[52] U.S. Cl. .................................. 264/53; 264/211; 264/DIG. 5; 264/DIG. 13; 521/88; 521/89; 521/95; 521/139; 521/145; 521/909; 521/910; 521/81
[58] Field of Search ............... 521/88, 89, 95, 145, 521/79, 81, 139; 264/53, 211, DIG. 5, DIG. 13

[56] References Cited

U.S. PATENT DOCUMENTS

| | | | |
|---|---|---|---|
| 3,267,051 | 8/1966 | Landler et al. | 521/145 |
| 3,366,580 | 1/1968 | Kraemer, Jr. | 521/91 |
| 3,975,315 | 8/1976 | Parks | 521/145 |
| 4,046,846 | 9/1977 | Fujimori | 521/60 |
| 4,048,272 | 9/1977 | Spicuzza, Jr. | 521/60 |
| 4,165,415 | 8/1979 | Adachi et al. | 521/145 |

FOREIGN PATENT DOCUMENTS 710379  5/1965  Canada .

*Primary Examiner*—Morton Foelak
*Attorney, Agent, or Firm*—George A. Kap

[57] ABSTRACT

Composition of matter adapted to be foamed into essentially a closed cell structure, preponderance of the cells being less than 500 microns in size and containing a chlorofluoroalkane of 1 to 2 carbon atoms, said composition comprising chlorinated polyvinyl chloride resin, and effective amount of a blowing agent, an effective amount of a nucleating agent, and 5 to 20 parts of a processing aid per 100 parts of said resin, said processing aid has a dilute solution viscosity of greater than 2.5 and is selected from copolymers of styrene and acrylonitrile containing 10 to 40% of acrylonitrile.

10 Claims, No Drawings

CHLORINATED POLYVINYL CHLORIDE COMPOSITION

BACKGROUND OF THE INVENTION

A processing aid is used in a resin composition to hasten fusion, to smooth out an otherwise rough texture of the resin composition and to soften the resin so that it uniformly melts within a short period of time. Materials that melt easily, such as acrylonitrile-butadiene-styrene resins, do not require a processing aid. Commercial polyvinyl choride (PVC) is conventionally milled with a processing aid although it can be melted without one, however, commercial chlorinated polyvinyl chloride (CPVC) has a high melt viscosity and, therefore, requires a processing aid without which it cannot be acceptably melt-blended within a relatively short time, such as within no more than 2 to 3 minutes and desirably less than 2 minutes. Since the fusion temperature of CPVC is relatively high, even prolonged mixing at about 190° C. can cause evolution of hydrogen chloride and consequent degradation of the resin. Of course, degradation of the resin can be postponed or deferred by adding more stabilizer or more processing aid, both of which are expensive. However, this is not a practical solution since it increases the cost of the resin blend and decreases heat distortion temperature due to the plasticizing effect of the stabilizer or the processing aid. Processing at higher temperatures than is normally required with the use of a processing aid accelerates hydrogen chloride evolution, discolors the resin, and results in a low quality product. Thus, from a practical point of view, a processing aid is essential to melt-blend CPVC.

Hard, glassy polymers, such as methyl methacrylate, are generally used as processing aids in PVC but not in CPVC. Rubbery polymers, such as chlorinated polyethylene, are generally used as processing aids in CPVC but not in PVC.

Canadian Pat. No. 710,379 discloses compositions comprising chlorinated polyvinyl chloride resin and 1 to 15 parts of a styrene-acrylonitrile copolymer containing 20 to 50% by weight of acrylonitrile. The compositions are used to make unfoamed products. The styrene-acrylonitrile copolymers, that are used as processing aids, have dilute solution viscosity (DSV) of 0.2 to 0.7 and the use of such copolymers outside of this range will render the compositions inoperative, see bottom of page 4 and top of page 5 of the patent. The DSV of the styrene-acrylonitrile copolymers was measured in methyl ethyl ketone at 0.25% concentration.

SUMMARY OF THE INVENTION

This invention relates to foamed CPVC and to CPVC compositions adapted to be foamed, method for making foamed CPVC and to CPVC foam itself. The CPVC compositions comprise CPVC resin and 5 to 20 parts per 100 parts by weight of the resin of a processing aid selected from hard, glassy copolymers of styrene and acrylonitrile containing 10 to 40% acrylonitrile. Inclusion of the herein-disclosed processing aid in a CPVC composition results in a foamed product that has a fine, uniform cell structure wherein preponderance of the cells are less than 500 microns in size.

DETAILED DESCRIPTION OF THE INVENTION

Hard, glassy polymers, such as styrene-acrylonitrile and methyl methacrylate, are generally used as processing aids in PVC but not in CPVC. When used in CPVC compositions for non-foam applications, such as pipe and other solid extruded products, such hard polymers do not impart any significant effect. Contrary to prior art teachings, however, it was found that the hard, glassy polymers serve as very effective processing aids in CPVC compositions that are foamed into expanded products used especially as insulating construction materials. Such processing aids, when used in CPVC compositions melt before the CPVC resin to hold the resin particles together and facilitate an accelerated, uniform melting of the resin.

In a conventional extruder that is used to make a foamed product, a resin composition is introduced into the extruder at one end, it is heated and melted as it is advanced downstream, a blowing agent is injected into the molten resin as the composition is advanced past an injection port, the composition is mixed to disperse the blowing agent and then extruded into a zone of lower pressure whereby the blowing agent expands and forms numerous cells in the resin. It is desired to have all of the resin in a molten state when it is injected with a blowing agent so that the blowing agent is uniformly accepted by the resin and uniform distribution thereof is attained. In such an instance, the extruder can be substantially shorter in length since a long mixing section is not necessary. A resin that is not completely melted, however, contains pockets of molten resin and solid particles thereof interspersed therebetween. When a blowing agent is introduced into an incompletely melted resin, it is accepted differently by the liquid and solid portions of the resin due to different rates of solubility in the liquid and solid resin. Furthermore, since the blowing agent is liquid under pressure, when it is mixed with a portion of the liquid resin, it reduces viscosity of the molten resin thus further contributing to non-uniformity of the mixture. Although the blowing agent and the resin are mixed downstream of the injection port, the length of the mixing section in the extruder is insufficient to obtain a uniform mixture before exiting from the extruder through a die although such a mixing section is of sufficient length to accomodate a mixture of a completely melted resin and a blowing agent.

It should be remembered that in a low density foam, i.e., foam that has a density of about 20 lbs/ft$^3$ or less, about 2% of the volume is resin and about 98% is the gas in the cells. On weight basis, resin in the foam constitutes about 90% and 10% gas. With such a weight distribution, it is of utmost important that the blowing agent be uniformly distributed so that the foam product has a uniform cell structure with certain minimum mechanical properties. In absence of uniform cell structure, the foam product will have large pockets of gas that will impart a negative influence on the mechanical properties thereof.

The invention herein, therefore, resides in admixing a hard, glassy processing aid with a CPVC resin in order to obtain a foam product of uniform cell distribution wherein preponderance of the cells are less than 500 microns in size and are closed cells. It should be understood that reference to preponderance of cells being of certain size is an inexact approximation and is used as a general guideline. The cell sizes were determined by taking photomicrographs along a section cut through a foam sample. In many photomicrographs where the cell size was on the order of 1000 microns, only one whole cell and portions of a few other cells showed whereas photomicrographs of foam samples having cell sizes of 200 to 300 microns showed many whole cells and apparently portions of many others. It should be understood that what may appear on a photomicrograph to be a whole cell may in fact be only a corner of a large whole cell. Therefore, based on examination of the photomicrographs it appears safe to state that by the term "preponderance" is meant at least 50% and probably in excess of 75%.

The foams of the present invention can be prepared by absorbing a liquified blowing agent in CPVC resin and then expanding the blowing agent into a gas thereby forming cells within the resin. This can be done by introducing the resin in solid particulate form into an extruder, heating the resin to melt same, and injecting a blowing agent directly into the melted resin as the melt is advanced through the extrusion cylinder. When the melt is forced through the extrusion die into a zone of lower pressure, the blowing agent expands to form a cellular product.

In another method for making foam product, CPVC resin particles are placed in a pressure vessel along with a liquified blowing agent. The vessel is heated to a temperature in the range of about 50° C. to 150° C., but not exceeding the melting point of the resin, and is maintained under sufficient pressure to keep the blowing agent in a liquified state. The resin particles are then mixed with the blowing agent until the desired amount of the blowing agent is absorbed, cooled and removed from the vessel in an unexpanded state.

The CPVC resin particles impregnated with a blowing agent can be foamed in a number of ways. The resin can be fed through an extruder equipped with heating means and as it is advanced through the extrusion cylinder, it is converted to a viscous melt having a temperature above the normal boiling point of the blowing agent absorbed in the resin. Heating the blowing agent above its normal boiling point generates high pressures within the extruder. While the resin is confined within the extrusion cylinder, the blowing agent cannot boil or expand due to the fact that the system is under pressure. When the hot resin composition is forced through the extruder head into a zone of lower pressure, the blowing agent boils or expands with the resin forming a continuous log of a cellular resin.

The CPVC resin used herein can be in powder form having a particle size generally in the range of 10 to 600 microns. The resin can also be used in the form of cubes pellets that are made by pelletizing the CPVC powder by the use of pellet mills or tablet presses. Typical pellets are cylinders of 3/16" in diameter by ⅜" in length and typical cubes are ⅛" in size, however, the pellets and cubes can be of different size and the resin particles can be of a different shape.

The chlorinated polyvinyl chloride employed in the present invention can be readily prepared by the post-chlorination of commercially available polyvinyl chloride. Prior to post-chlorination, the polyvinyl chloride generally has a chlorine content of about 56.7% by weight, a glass transition temperature of from about 75° to 80° C., and a density of about 1.40 grams per cubic centimeter. Polyvinyl chloride can be post-chlorinated by a number of procedures including chlorination in a solution; chlorination in an aqueous suspension, or a suspension in a swelling agent; and direct chlorination of dry, polyvinyl chloride powder. A typical procedure for carrying out such a chlorination comprises agitating an aqueous suspension of 15 parts by weight of polyvinyl chloride and 100 parts by weight of water in a pressure vessel which has been purged with nitrogen, heating the suspension to 140° C. and introducing chlorine at a rate of about 2 parts by weight per hour until the polyvinyl chloride has been chlorinated to the desired extent.

In order to foam the chlorinated polyvinyl chloride in accordance with the present invention, it must have a minimum chlorine content of at least 60% by weight, while for practical purposes, the maximum chlorine content feasible is about 75% by weight. The preferable chlorine content is about 64-73% by weight. As the chlorine content of the polymer is increased from 60% to 64% by weight, two advantages are obtained. First, the ability to tolerate high temperatures is increased from about 80° C. to about 100° C., thus enabling the polymer to better withstand contact with hot objects such as steam pipes and molten tar. Second, it is easier to retain the chlorofluoroalkane blowing agents within the chlorinated polyvinyl chloride. Thus, at 64% chlorine content by weight, it has been found possible to produce light weight, uniform cellular products which have densities of less than 3 pounds per cubic foot, contain chlorofluoroalkane blowing agents within their cells, and are dimensionally stable at temperatures up to about 100° C.

The glass transition temperature (Tg) is that temperature below which a polymer remains hard and glassy as opposed to soft and rubbery. The glass transition temperature of chlorinated polyvinyl chloride increases with increasing chlorine content. Polyvinyl chloride itself has a glass transition temperature of about 75°-80° C., while typical glass transition temperatures for chlorinated polyvinyl chloride suitable for the present invention are about 87° C. for 60% chlorine content, about 106° C. for 64% chlorine content, about 128° C. for 68% chlorine content, and about 178° C. for 75% chlorine content. The maximum obtainable temperature of dimensional stability is generally a few degrees below the glass transition temperature of the polymer.

In place of polyvinyl chloride homopolymer, there can be used, as a starting material, either a mixture of polyvinyl chloride polymer with a minor amount of other polymer or copolymer of vinyl chloride with a minor amount of another monomer(s) that are selected from other vinyl halides and vinylidene halides such as vinylidene chloride, vinyl esters such as vinylacetate, vinyl butyrate and vinyl benzoate; acrylic α-alkyl acrylic acids, their alkyl esters, amides and nitriles such as acrylic acid, methacrylic acid, ethyl acrylate, octyl acrylate, methyl methacrylate, acrylamide, and acrylonitrile; vinyl aromatic compounds such as styrenes that include styrene, chlorostyrene, and ethyl styrene; vinyl napthalene; alkyl esters of maleic and fumaric acids such as diethylmaleate; vinyl alkyl esters and vinyl alkyl ketones; vinyl pyridine; isobutylene and various other polymerizable monoolefinic monomers, especially those containing the $CH_2=C<$ group. Up to about 20% by weight of the vinyl chloride can be replaced by one or more monoolefinic copolymerizable monomers described above.

The processing aids used in connection with CPVC are selected from hard, glassy copolymers of styrene and acrylonitrile. Such processing aids have Tg in excess of 60° C., preferably in excess of 80° C., and dilute solution viscosity greater than 1.5, preferably greater than 2.5. Dilute solution viscosity was measured in methylethyl ketone at 4% concentration. It should be understood, however, that dilute solution viscosity measured at 4% concentration does not differ much from one determined at 0.25% concentration, the difference being 10% to 20%, at the most because the calculation of DSV corrects for concentration. Amount of the processing aid can vary from 1 to 30 parts by weight, preferably 5 to 20 parts per 100 parts by weight of the resin.

The styrene copolymers are prepared by polymerizing a monomeric mixture of a styrene and an unsaturated nitrile. Such mixtures may also contain minor amounts up to about 20% by weight, of copolymerizable monoolefinic monomers that contain a terminal vinylidene group ($CH_2=C$), of the type hereinbefore described. The styrene utilized is preferably styrene itself. Other useful styrenes include alkyl styrenes, especially alpha-methyl styrene, vinyl toluene, ethyl styrene; halo-styrenes such as chlorostyrenes represented by monochlorostyrene and dichlorostyrenes; and alkoxy styrenes and styrene derivatives copolymerizable with acrylonitrile. Better results are obtained if the resin contains greater than 50% of bound styrene or is prepared from monomer mixtures containing greater than 50 weight percent of styrene. The nitrile comonomer employed in the monomer mixture is preferably acrylonitrile. Other useful nitriles include alkyl acrylonitriles such as methacrylonitrile and ethacrylonitrile, chloroacrylonitrile and the like, in amounts from 10 to 40% in the monomer mixture and resulting copolymer. The other minor monoolefinic constituents, if employed, are preferably less than 20%. It is preferred to use, however, polymers prepared from monomer mixtures containing about 60 to 90 weight percent of styrene and 10 to 40 weight percent of acrylonitrile, more preferably 15 to 35%.

The styrene copolymers may be prepared by any of the polymerization techniques known to and employed by those skilled in the art. Such methods as solution suspension, emulsion and the like are preferred.

Suitable blowing agents are the halogenated hydrocarbons containing 1 to 3 carbon atoms such as methyl chloride, methylene dichloride, ethyl chloride, ethylene dichloride, n-propyl chloride, and methyl bromide. A preferred group of halogenated hydrocarbon blowing agents is chorofluoroalkanes of from 1 to 2 carbon atoms such as trichloromonofluoromethane, dichlorodifluoromethane, dichloromonofluoromethane, monochlorodifluoromethane, trichlorotrifluoroethane, dichloroterafluoroethane, and monochlorotrifluoroethane. Although the blowing agent can be used in an amount of about 5% to 50%, it is preferred to have a quantity of blowing agent from about 10% to 40% by weight of the chlorinated polyvinyl chloride absorbed in the polymer at the commencement of the foaming procedure. If the chlorinated polyvinyl chloride is stored in unexpanded form for any length of time after impregnation with the blowing agent, an excess of blowing agent should be initially absorbed to allow for losses.

A particularly outstanding product can be obtained when chlorinated polyvinyl chloride is expanded with one of the above-mentioned chlorofluoroalkanes. A substantial portion of the chlorofluoroalkane remains entrapped in the closed cells of the resulting foam. Since the thermal conductivities of the chlorofluoroalkanes are lower than that of air, the insulating properties of the resulting foam are superior to those foams having cells filled with air. Thermal conductivity of chlorinated polyvinyl chloride foam containing a chlorofluoroalkane blowing agent trapped in the cells is less than 0.20 Btu/(hr)(ft$^2$)(°F./in), and even after prolonged storage, thermal conductivity of the foam usually reaches equilibrium at about 0.13.

Suitable nucleating agents include inorganic salts that liberate carbon dioxide, such as bicarbonates, or organic compounds that include azo amides such as azodicarbonamide; azo compounds such as azodiisobutyric dinitrile; sulphonylhydrazides such as p,p'-oxybis(benzene sulphonyl hydrazide and p-toluene sulfonyl semicarbazide; hydrazones such as benzyl hydrazones; organic nitrites, nitroso compounds, ureas and salts thereof, etc. Combinations of sodium bicarbonate and citric acid have been used in the past with good results, however, in our work, we found that the preferred nucleating agent is azodicarbonamide. Amount of the nucleating agent can vary from 0.01 to 2 parts, preferably 0.1 to 1 part per 100 parts of the CPVC resin.

Stabilizers known to those skilled in the art have been found useful in CPVC resin compositions described herein in amounts of about 0.5 to 5 parts per 100 parts of the resin. Suitable stabilizers include tin stabilizers, particularly the tin mercaptides such as dibutyl tin thioethyldiglycolate and the lauryl derivatives.

Lubricants and lubricant mixtures can be included in the CPVC resin compositions in amounts of about 0.5 to 5 parts per 100 parts of the resin. Suitable lubricants include paraffin, polyethylene, calcium stearate, ethylenebis stearylamide, and other lubricants known to and used by those skilled in the art. High melting point lubricants melting above 250° F. are preferred, examples of which are amide waxes and metal salts of fatty acids.

Inorganic fillers of fine particle size can also be included in amount of about 1 to 15 parts by weight per 100 parts of the CPVC resin. Examples of such fillers are titanium dioxide, iron oxide, calcium carbonate, silicas, and the like.

The foam products of this invention are rigid foams of CPVC resin containing 60 to 75% by weight chlorine, with a glass transition temperature of at least about 86° C., a density of 1 to 20 lbs/ft$^3$, and a predominantly closed cell structure in which at least about 60% of the cells are closed. Preferred products are foamed of CPVC resin containing 64 to 73% chlorine, with a glass transition temperature of at least about 105° C., density of less than 5 lbs/ft$^3$, and a cell structure in which at least about 85% of the cells are closed. Predominant number of cells in the foam are less than 500 microns in size and contain a chlorofluoroalkane of 1 to 2 carbon atoms. Foams containing a chlorofluoroalkane in the cells have thermal conductivity of less than 0.20 Btu/(hr)(ft$^2$) (°F./in). The foams of this invention are nonflammable and thus do not require incorporation of fireproofing agents. Such foams can be used in heat and sound insulation as construction materials, in floats, packaging, and the like.

EXAMPLE 1

The chlorinated polyvinyl chloride used herein was in cube form about ⅛" square that was soaked in the primary blowing agent at 80° C. and at 80 psi for 72 hours, together with other ingredients in the formulation, as indicated in Table I, below. Thirty parts of trichlorofluoromethane was used per 100 parts of the resin. In making the foam, the soaked formulation was first melted on a mill and then passed through a ¾" diameter single screw extruder with a 25/1 L/D operating at 30 rpm. The die was of a dog bone design 0.0175 in² in area and 0.396" long. The temperature profile of the extruder was as follows:

1st zone--105° C.
2nd zone--165° C.
3rd zone--160° C.
die zone--155° C.

The product emerged as a narrow strip about 1" wide of a variable thickness of about ¼". Results of testing different processing aids, nucleating agents and varying levels of azodicarbonamide in the numbered samples are set forth in Table I, below, where amounts given are in parts by weight, unless otherwise specified.

butadiene/styrene processing aid was used resulting in no foam. In sample 10, chlorinated polyethylene processing aid made a very non-uniform foam. In sample 11, styrene/acrylonitrile performed well as a processing aid even without the 3 parts of chlorinated polyethylene. Deletion of the SAN from sample 12 resulted in very poor mill behavior but in partly good foam. Conversely, most of the alternate processing aids substituted for SAN resulted in improved mill behavior but very poor foam.

Although some of the samples above appeared to be acceptable in spite of absence of a processing aid except for the poor showing on the mill, subsequent tests with powder melted in an extruder proved the necessity of a processing aid in the compositions.

TABLE I

|   | 1 | 2 | 3 | 4 | 5 | 6 | 7 | 8 | 9 | 10 | 11 | 12 |
|---|---|---|---|---|---|---|---|---|---|---|---|---|
| CPVC Resin, 67% Cl | 100 | 100 | 100 | 100 | 100 | 100 | 100 | 100 | 100 | 100 | 100 | 100 |
| Butyl Tin Stabilizer | 3 | 3 | 3 | 3 | 3 | 3 | 3 | 3 | 3 | 3 | 3 | 3 |
| Styrene/Acrylonitrile Copolymer (25% AN) | 10 | 10 | 10 | 10 | 10 | 10 | — | — | — | — | 10 | — |
| Acrylic Processing Aid | — | — | — | — | — | — | 10 | — | — | — | — | — |
| Alpha-Methyl Styrene | — | — | — | — | — | — | — | 10 | — | — | — | — |
| SBS Block Polymer | — | — | — | — | — | — | — | — | 10 | — | — | — |
| Chlorinated Polyethylene (35% Cl, chlorinated in soln.) | — | — | — | — | — | — | — | — | — | 10 | — | — |
| Chlorinated Polyethylene (35% Cl, chlorinated in suspension) | 3 | 3 | 3 | 3 | 3 | 3 | 3 | 3 | 3 | 3 | — | — |
| Lubricant | 2.4 | 2.4 | 2.4 | 2.4 | 2.4 | 2.4 | 2.4 | 2.4 | 2.4 | 2.4 | 2.4 | 2.4 |
| Titanium Dioxide | 0.8 | 0.8 | 0.8 | 0.8 | 0.8 | 0.8 | 0.8 | 0.8 | 0.8 | 0.8 | 0.8 | 0.8 |
| Azodicarbonamide (0.003 mm) | 0.5 | 0.25 | 1 | — | — | — | 0.5 | 0.5 | 0.5 | 0.5 | 0.5 | 0.5 |
| Azodicarbonamide (0.012 mm) | — | — | — | 0.5 | — | — | — | — | — | — | — | — |
| TSS | — | — | — | — | 0.5 | — | — | — | — | — | — | — |
| BSH | — | — | — | — | — | 0.5 | — | — | — | — | — | — |
| Cell Size, mm | 0.15 | 0.10 | 0.10 | 0.11 | 0.50 | 0.50 | no foam | 0.15 | no foam | 0.20 | 0.16 | 0.10 |
| Uniformity of Foam | Uniform→→→→→→→→→→ | | | | SNU | NU | no foam | VNU | no foam | VNU | Uniform | |

The stabilizer in Table I, above, was dibutyl tin dithioglycolate; SBS represents styrenebutadiene-styrene; the acrylic processing aid was methyl methacrylate-ethyl acrylate copolymer, 95-5 weight percent, respectively; the lubricant was composed of calcium stearate, ethylene bis-stearamide, and ester wax in one-third proportion of each; TSS was a blowing agent p-toluene sulfonyl semicarbazide; BSH was a blowing agent p,p'-oxybis (benzene sulfonyl hydrazide); NU, SNU and VNU represent non-uniform, slightly non-uniform, and very non-uniform, respectively.

Samples 1, 2, 3 and 4 had good uniform foam properties even though the nucleating agent (azodicarbonamide) was varied in level and in particle size. Samples 5 and 6 had large cell size and non-uniformity because the TSS and BSH blowing agents did not work acceptably as compared to azodicarbonamide. The styrene/acrylonitrile processing aid is common in all these compounds. In sample 7, where acrylic processing aid was substituted for styrene/acrylonitrile processing aid, there was no stable foam. In sample 8, where alpha-methyl styrene processing aid was used, the results were poor as judged by the very non-uniform foam structure. In sample 9, a block polymer of styrene/-

EXAMPLE 2

The chlorinated polyvinyl chloride resin used herein contained 67% chlorine and was in powder form. The resin was fed in powder form, unimpregnated with a blowing agent, into an extruder where it was melted, admixed with trichlorofluoromethane blowing agent and extruded into a foam product. The extruder used was a 3½ inch diameter single screw extruder with a 32/1 L/D, operating at 18 rpm. The die was of a dog bone design of 0.375 square inches in area and 2.0 inches long. The foamed product emerged as a strip about 7 inches wide with a variable thickness on the order of about 1 inch. The temperature profile of the extruder was as follows:

1st zone--160° C.
2nd zone--177° C.
3rd zone--157° C.
4th zone--82° C.
5th zone--66° C.
die zone--149° C.

Formulation of the samples is given in Table II, below, in parts by weight:

TABLE II

|   | 1 | 2 | 3 | 4 | 5 | 6 | 7 |
|---|---|---|---|---|---|---|---|
| CPVC Resin | 100 | 100 | 100 | 100 | 100 | 100 | 100 |
| Dibutyltin Dithio glycolate Stabilizer | 2 | 2 | 3 | 3 | 3 | 3 | 3 |
| Styrene/Acrylonitrile | | | | | | | |

TABLE II-continued

| | 1 | 2 | 3 | 4 | 5 | 6 | 7 |
|---|---|---|---|---|---|---|---|
| Copolymer (25% AN) | 10 | — | 10 | 10 | 10 | 10 | — |
| Methyl Methacrylate/ Ethyl Acrylate Copolymer (95% MMA) | — | — | — | — | — | — | 10 |
| Chlorinated Polyethylene (35% Cl, chlorinated in suspension) | 3 | 3 | 3 | 3 | 3 | 3 | 3 |
| Titanium Dioxide | — | 0.8 | — | 0.8 | 0.8 | 0.8 | 0.8 |
| Lubricant Calcium Stearate | 0.4 | 0.4 | 0.6 | 0.4 | — | 0.6 | 0.6 |
| Lubricant Ethylene Bis-Stearamide | 0.4 | 0.4 | 0.6 | 0.4 | — | 0.6 | 0.6 |
| Lubricant Ester Wax | 0.4 | 0.4 | 0.6 | 0.4 | — | 0.6 | 0.6 |
| Lubricant (Henkel Loxiol GH4) | — | — | — | — | 1.8 | — | — |
| Azodicarbonamide (0.003 mm) | — | 0.5 | 0.5 | — | 0.5 | 0.5 | 0.5 |
| Azodicarbonamide (0.012 mm) | 0.5 | — | — | 0.5 | — | — | — |
| Foam Density, lbs/ft$^3$ | 2.4 | no foam cells collapsed | 2.8 | 2.3 | 2.3 | 2.2 | 15 cells collapsed |

In this example, it was found that the various levels of dibutyltin dithioglycolate made good foam. Good foam was made with or without titanium dioxide. Various levels and types of lubrication made good foams. Both sizes of azodicarbonamide also made good foam. The addition of styrene/acrylonitrile copolymer processing aid made good foam, however, sample 2, without styrene/acrylonitrile copolymer did not foam. This therefore, shows the critical need for this type processing aid. The methyl methacrylate/ethylacrylate copolymer in sample 7 did not perform acceptably even though it is also considered to be a hard, glassy processing aid.

We claim:

1. Composition of matter adapted to be foamed comprising chlorinated polyvinyl chloride resin containing at least 60% chlorine by weight, an effective amount of a blowing agent to cause said resin to foam, an effective amount of a nucleating agent for providing nucleating sites for forming cells filled with said blowing agent, and 1 to 30 parts by weight of a processing aid per 100 parts by weight of said resin, said processing aid has a Tg of greater than 60° C., has dilute solution viscosity greater than 1.5, and is selected from copolymers of a styrene and an unsaturated nitrile containing more than 50% of said styrene and 10 to 40% of said nitrile.

2. Composition of claim 1 wherein amount of said processing aid is 5 to 20 parts, said styrene is selected from styrene itself, α-methyl styrene, vinyl toluene, ethyl styrene, monochlorostyrene, and dichlorostyrene; said nitrile is selected from acrylonitrile, methacrylonitrile ethacrylonitrile, and chloroacrylonitrile; and said blowing agent is selected from chlorofluoroalkanes of 1 to 2 carbon atoms.

3. Composition of claim 2 wherein said processing aid has a dilute solution viscosity greater than 2.5; said resin is selected from homopolymers of vinyl chloride and copolymers thereof with up to about 20% by weight of other polymerizable monomers; and said processing aid is selected from copolymers of a styrene and a nitrile and polymers of a styrene, a nitrile and up to about 20% by weight of the monomer weight of other polymerizable monomers.

4. Composition of claim 2 wherein said blowing agent is a chlorofluoroalkane of 1 carbon atom that is present in amount of 5 to 50 parts, and said nucleating agent is azodicarbonamide that is present in amount of 0.01 to 2 parts, amounts being in parts by weight per 100 parts by weight of said resin.

5. Composition of claim 4 wherein said processing aid has a dilute solution viscosity is greater than 2.5, amount of said blowing agent is 10 to 40 parts, and amount of said nucleating agent is 0.01 to 1 parts, said composition further includes 0.5 to 5 parts of a stabilizer selected from tin stabilizers and mixtures thereof, and 0.5 to 5 parts of a lubricant, all based on 100 parts by weight of said resin.

6. Composition of claim 5 wherein said composition is adapted to be foamed into a product in which at least about 85% of cells are closed, preponderance of cells has less than 500 microns in size, and the product has a density of less than 5 lbs/ft$^3$, said processing aid is selected from copolymers of 60 to 90 parts styrene and 40 to 10 parts acrylonitrile.

7. Composition of claim 6 wherein said stabilizer is selected from tin mercaptides, thioethyldiglycolate, and lauryl derivatives, and said lubricant is selected from paraffin, polyethylene, calcium stearate, and ethylene-bis stearamide.

8. A rigid, nonflammable, thermoplastic foam in which at least 60% of the cells are closed, said foam having a density of less than 5 lbs/ft$^3$, thermal conductivity of less than 0.20 Btu/(hr) (ft$^2$)(°F./in), and a chlorofluoroalkane of 1 to 2 carbon atoms trapped in the closed cells, said foam comprising chlorinated polyvinyl chloride having a glass transition temperature of at least about 105° C. and a chlorine content of at least 64%, 0.01 to 2 parts of azodicarbonamide nucleating agent dispersed therein forming the nuclei for the cells, and 5 to 20 parts of a hard, glassy processing and having a dilute solution viscosity greater than 2.5 selected from copolymers of styrene and acrylonitrile containing 10 to 40% acrylonitrile.

9. Method for making a foam product comprising feeding into an extruder powdered chlorinated polyvinyl chloride composition, melting said composition as it is advanced through the extruder, injecting a blowing agent into said melted composition, mixing said composition and said blowing agent to more uniformly distribute said blowing agent in said composition, and then forcing said composition into a zone of lower pressure whereby said blowing agent expands to form the foam product in which at least 85% of the cells are closed cells, preponderance of the cells are less than 500 microns, its density is less than 5 lbs/ft$^3$, and its thermal conductivity is less than 0.20 Btu/(hr) (ft$^2$)(°F./in), said composition comprising chlorinated polyvinyl chloride resin having a glass transition temperature of at least 105° C. and a chlorine content of at least 64%, 0.01 to 2 parts by weight of a nucleating agent dispersed therein forming nuclei for the cells, and 1 to 30 parts by weight of a hard glassy processing aid selected from copolymers of a styrene and a nitrile containing 10 to 40% nitrile, having dilute solution viscosity greater than 1.5.

10. Method of claim 9 wherein said nucleating agent is azodicarbonamide, and amount of said processing aid is 5 to 20 parts by weight, said processing aid having dilute solution viscosity greater than 2.5.

* * * * *